(12) United States Patent
Okamoto et al.

(10) Patent No.: US 7,792,060 B2
(45) Date of Patent: Sep. 7, 2010

(54) INFORMATION ANALYSIS APPARATUS AND COMPUTER READABLE MEDIUM

(75) Inventors: Hiroshi Okamoto, Kanagawa (JP); Yukihiro Tsuboshita, Kanagawa (JP); Xiaojun Ma, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 130 days.

(21) Appl. No.: 12/193,493

(22) Filed: Aug. 18, 2008

(65) Prior Publication Data

US 2009/0154376 A1 Jun. 18, 2009

(30) Foreign Application Priority Data

Dec. 18, 2007 (JP) ............................. 2007-326563

(51) Int. Cl.
*H04L 12/28* (2006.01)
(52) U.S. Cl. ................................. 370/255; 707/3; 707/5
(58) Field of Classification Search .................. 370/255; 707/3, 5
See application file for complete search history.

(56) References Cited

U.S. PATENT DOCUMENTS 6,038,574 A * 3/2000 Pitkow et al. ............... 715/210
2007/0288442 A1* 12/2007 Iwayama et al. ............... 707/3
2008/0114753 A1* 5/2008 Tal-Ezer .......................... 707/5
2008/0222137 A1* 9/2008 Okamoto et al. .............. 707/5

FOREIGN PATENT DOCUMENTS

| JP | 2006-060124 A | 3/2006 |
|---|---|---|
| JP | 2006-133844 A | 5/2006 |
| JP | 2006-243804 A | 9/2006 |

OTHER PUBLICATIONS

Lawrence Page, Sergey Brin, Rajeev Motwani, Terry Winograd, "The Page Rank Citation Ranking: Bringing Order to the Web", Jan. 29, 1998, pp. 1-17.

* cited by examiner

*Primary Examiner*—Albert T Chou
(74) *Attorney, Agent, or Firm*—Sughrue Mion, PLLC

(57) ABSTRACT

An information analysis apparatus includes: a storage that stores data values while respectively correlating the data values with plural nodes; a first setting unit that, for the nodes, sets a first virtual link that is directed oppositely to a predetermined directed link; a second setting unit that adds a virtual nodes to the nodes, and that sets a second virtual link which is bidirectional between the added virtual node and each of the nodes; and a updating unit that updates data values respectively correlated with the nodes, on the basis of respective weights of predetermined links between the nodes, the first virtual link, and the second virtual link.

5 Claims, 3 Drawing Sheets

INFORMATION ANALYSIS APPARATUS AND COMPUTER READABLE MEDIUM

CROSS-REFERENCE TO RELATED APPLICATIONS

This application is based on and claims priority under 35 U.S.C. 119 from Japanese Patent Application No. 2007-326563 filed Dec. 18, 2007.

BACKGROUND

1. Technical Field

The present invention relates to an information analysis apparatus and a computer readable medium.

2. Related Art

A citation network is configured by linking groups of scientific and technical literatures such as scientific papers and patents to one another through "citation relationship". When such a citation network is analyzed, it is possible to obtain useful information.

SUMMARY

According to an aspect of the present invention, an information analysis apparatus includes: a storage that stores data values while respectively correlating the data values with a plurality of nodes; a first setting unit that, for the nodes, sets a first virtual link that is directed oppositely to a predetermined directed link; a second setting unit that adds a virtual nodes to the nodes, and that sets a second virtual link which is bidirectional between the added virtual node and each of the nodes; and a updating unit that updates data values respectively correlated with the nodes, on the basis of respective weights of predetermined links between the nodes, the first virtual link, and the second virtual link.

BRIEF DESCRIPTION OF THE DRAWINGS

Exemplary embodiment of the present invention will be described in detail based on the following figures, wherein.

DETAILED DESCRIPTION

Hereinafter, exemplary embodiments (hereinafter, referred to as embodiments) to implement the invention will be described with reference to the drawings.

Example 1

Figure 1:
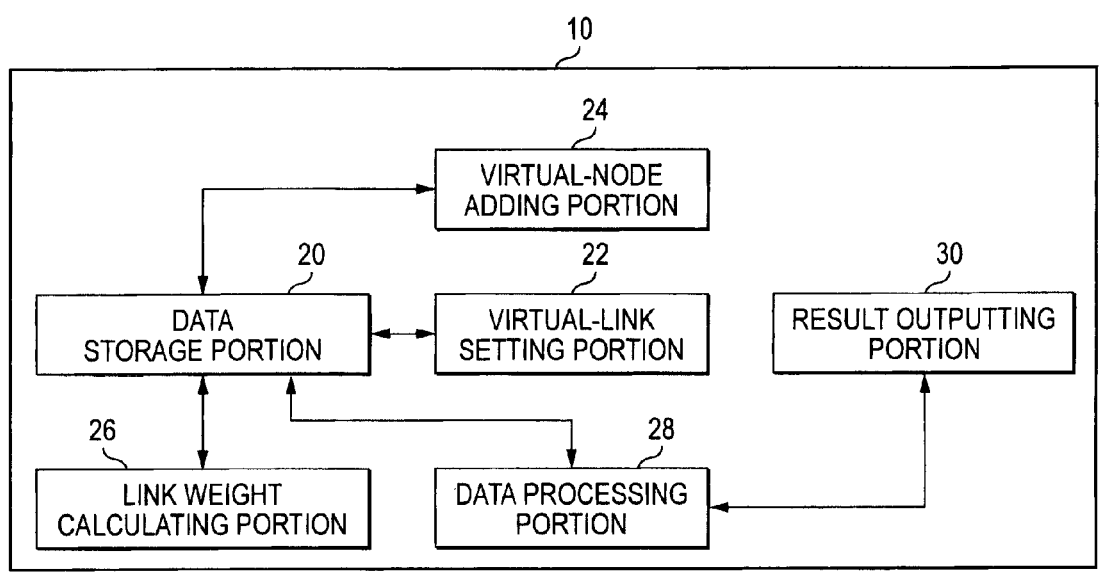
FIG. 1 is a functional block diagram of an information analysis apparatus of an embodiment.

FIG. 1 is a functional block diagram of an information analysis apparatus 10 of a first embodiment of the invention. As shown in FIG. 1, the information analysis apparatus 10 includes a data storage portion 20, a virtual-link setting portion 22, a virtual-node adding portion 24, a link weight calculating portion 26, a data processing portion 28, and a result outputting portion 30. The functions of the portions may be realized by operating the information analysis apparatus 10 which is a computer system, in accordance with computer programs. The computer programs may be stored in an information recording medium of any form which is readable by a computer, such as a CD-ROM, a DVD-ROM, or a flash memory, and read into the information analysis apparatus 10 by a medium reading apparatus which is connected to the information analysis apparatus 10, and which is not shown. Alternatively, the computer programs may be downloaded to the information analysis apparatus 10 through a network.

The data storage portion 20 stores information of plural objects (nodes) in which directional relationships and weights are previously defined. In the embodiment, the objects to be processed are documents which have citation relationships with respect to other documents, such as patent publications or scientific papers, and the directional relationships among the objects are expressed by citation relationships.

In the virtual-link setting portion 22, with respect to a document group stored in the data storage portion 20, a virtual link which is directed oppositely to a predetermined directed link is disposed, and each directed link is bidirectionalized. The virtual-link setting portion 22 may determine whether a directed link between nodes is bidirectional or not, and perform a process of disposing a virtual oppositely directed link on the basis of a result of the determination.

The virtual-node adding portion 24 adds a virtual node to a node group of a process object, and set a virtual bidirectional link between the added node and nodes to be processed.

Figure 2A:
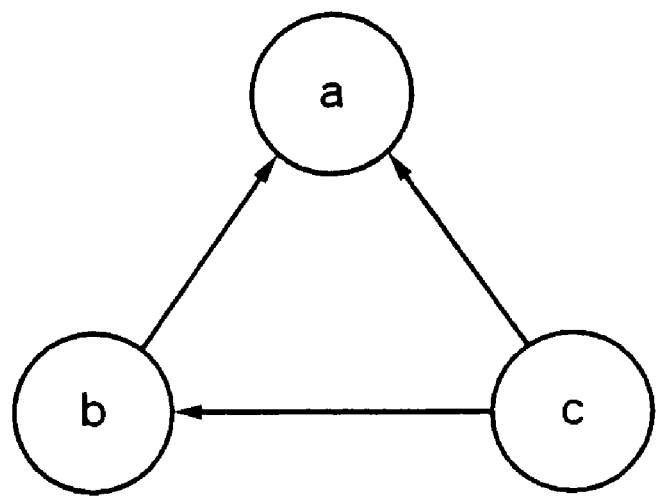
FIGS. 2A and 2B are views showing a part of a citation network in which citation relationships among documents are configured as links.

The processes of the virtual-link setting portion 22 and the virtual-node adding portion 24 will be specifically described with reference to FIGS. 2A and 2B. FIG. 2A exemplarily shows a part of a citation network in which, in a document group configured by plural documents stored in the data storage portion 20, the documents are set as nodes, respectively, and citation relationships among the documents are configured as links.

In the citation network shown in FIG. 2A, links based on predetermined citation relationships among the nodes are shown. As shown in FIG. 2A, nodes a, b, and c have the illustrated directional relationships in which the node b cites the node a, and the node c cites the nodes a and b. The node a is a node in which there is no link (out-link) directed to another node. A node in which there is no out-link, such as the node a, and that in which there is an out-link, such as the nodes b and c cannot be similarly handled in regularization (which will be described later) of an adjacency matrix in the case where no countermeasure is taken. In the embodiment, therefore, the citation network is expanded as shown in FIG. 2B in order to enable all nodes to be unifiedly handled.

Figure 2B:
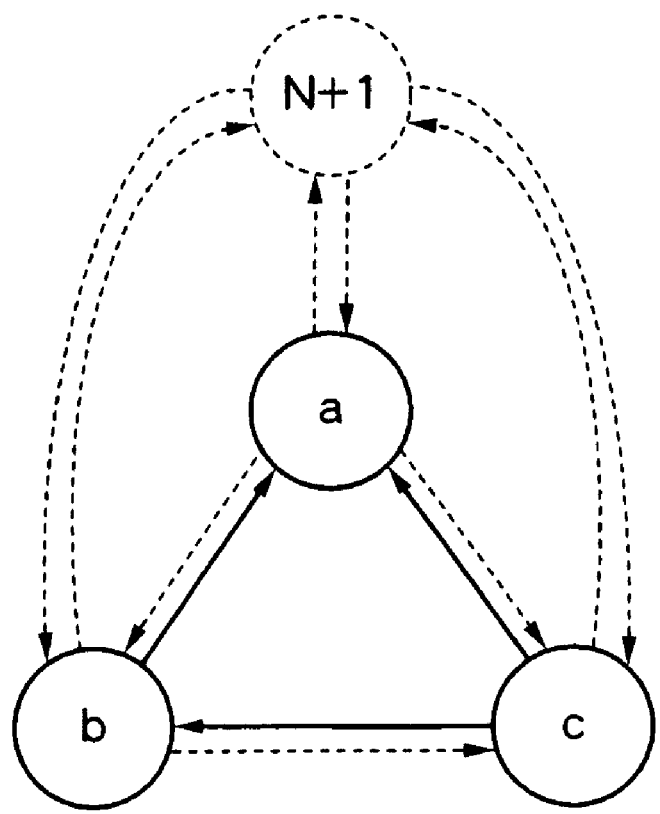

In the embodiment, as shown in FIG. 2B, namely, a virtual node (N+1) is added to the citation network, and directed links are virtually bidirectionalized. The links indicated by broken lines in FIG. 2B are virtual links, and the node indicated by a broken line is the virtual node (N+1) which is newly added. The virtual node (N+1) has bidirectional links with respect not only to the illustrated nodes a, b, and c, but also to all other nodes which are not illustrated. When the number of elements of a node group of a process object which is originally included in the citation network is N, the element number of the virtual node which is newly added is N+1.

Next, a calculation which is performed in the link weight calculating portion 26 for calculating the weights of the links will be described. In the embodiment, as information indicating the citation relationships among the nodes, a matrix (adjacency matrix) A indicating the citation network is defined in the following manner. In the case where the number of elements of a node group of a process object is N, the matrix A is defined as a matrix of N×N. The element numbers of documents may be allocated in the order in which the documents are produced. The i-row and j-column component of the adjacency matrix A ($1 \leq i \leq N$, $1 \leq j \leq N$) is indicated by $A_{ij}$. Then, $A_{ij}$ is defined by following Expressions (1) to (3). When a document j cites a document i, namely, the following is set:

$$A_{ij} = w \quad (1)$$

When not, the following is set:

$$A_{ij} = 0 \quad (2)$$

Hereinafter, the weight w of a link is uniformly defined as w=1. Each document does not cite itself, and hence $$A_{ii} = 0 \quad (3)$$

When the above-described matrix A is used, the number (out-link number) $k_{out}(j)$ of documents which are cited by the document j is indicated by following Expression (4):

$$k_{out}(j) = \sum_{i=1}^{N} A_{ij} \quad (4)$$

The number (in-link number) $k_{in}(j)$ of documents which cite the document j is indicated by following Expression (5):

$$k_{in}(j) = \sum_{i=1}^{N} A_{ij} \quad (5)$$

When the virtual node (N+1-th node) is added, $k_{out}(j)$ and $k_{in}(j)$ are corrected as shown in following Expressions (6) and (7). The virtual node is a node which has a bidirectional link with all of the nodes.

$$\tilde{k}_{out}(j) = k_{out}(j) + E \quad (6)$$

$$k_{in}(N+1) = NF$$

In the above expressions, E is the weight of a link (out-link) of each node to the virtual node, and F is the weight of a link (in-link) of each node from the virtual node. When the matrix A is regularized, the matrix A is indicated by following Expressions (8) to (11). The regularization means an operation of causing the total sum of weights of cited documents to be equal to a predetermined value m, i.e., that of correcting the out-link number to m. This operation is performed on an arbitrary document j. Actually, an individual document cites various numbers of other literatures. The above operation corresponds to that of regularizing the number to m. The above means that, in the case where ranking of documents is calculated with using a dynamic technique such as the spreading activation, the continuous fixed point attractor dynamics, or the virtual random walk, the ranking of the documents is determined while setting the number at which each of the documents is cited, in place of the number of literatures cited by each of the documents (a larger number does not mean that the value is higher, and a smaller number does not mean that the value is lower), as a main factor.

$$\tilde{A}_{ij} = \frac{m}{\tilde{k}_{out}(j)} A_{ij} \quad (8)$$

$$\tilde{A}_{N+1j} = \frac{m}{\tilde{k}_{out}(j)} E \quad (9)$$

$$\tilde{A}_{iN+1} = \frac{m}{\tilde{k}_{out}(N+1)} F = \frac{m}{N} \quad (10)$$

$$\tilde{A}_{N+1N+1} = 0 \quad (11)$$

In the above expressions, $1 \leq I \leq N+1$ and $1 \leq J \leq N+1$.

In each node, the total of the weights of out-links and in-links is indicated by following Expressions (12) to (15):

$$\sum_{I=1, I \neq j}^{N+1} \tilde{A}_{Ij} = \sum_{i=1, i \neq j}^{N} \tilde{A}_{ij} + \tilde{A}_{N+1j} \quad (12)$$

$$= \sum_{i=1, i \neq j}^{N} \frac{m}{\tilde{k}_{out}(j)} A_{ij} + \frac{m}{\tilde{k}_{out}(j)} E$$

$$= \frac{m}{\tilde{k}_{out}(j)} \sum_{i=1, i \neq j}^{N} A_{ij} + \frac{m}{\tilde{k}_{out}(j)} E$$

$$= \frac{m(k_{out}(j) + E)}{\tilde{k}_{out}(j)}$$

$$= m$$

$$\sum_{I=1, I \neq N+1}^{N+1} \tilde{A}_{IN+1} = \sum_{i=1}^{N} \tilde{A}_{iN+1} = \sum_{i=1}^{N} \frac{m}{n} = m \quad (13)$$

$$\sum_{I=1, I \neq j}^{N+1} \tilde{A}_{jI} = \sum_{i=1, i \neq j}^{N} \tilde{A}_{ji} + \tilde{A}_{jN+1} \quad (14)$$

$$= \sum_{i=1, i \neq j}^{N} \frac{m}{\tilde{k}_{out}(i)} A_{ji} + \frac{m}{N}$$

$$= m \left( \sum_{i=1, i \neq j}^{N} \frac{A_{ji}}{\tilde{k}_{out}(i)} + \frac{1}{N} \right)$$

$$= m \left( \tilde{\kappa}(j) + \frac{1}{N} \right)$$

$$\sum_{I=1, I \neq N+1}^{N+1} \tilde{A}_{N+1I} = \sum_{i=1}^{N} \tilde{A}_{N+1i} \quad (15)$$

$$= \sum_{i=1}^{N} \frac{m}{\tilde{k}_{out}(i)} E$$

$$= mE \sum_{i=1}^{N} \frac{1}{\tilde{k}_{out}(i)}$$

$$= mE\tilde{K}$$

In the above expressions, $$\tilde{\kappa}(j) = \sum_{i=1, i \neq j}^{N} \frac{A_{ji}}{\tilde{k}_{out}(i)} \quad (16)$$

-continued $$\tilde{K} = \sum_{i=1}^{N} \frac{1}{\tilde{k}_{out}(i)} \quad (17)$$

With respect to a unidirectioned link, a virtual oppositely directed link is set, so that the link is bidirectioned. Namely, an adjacency matrix defining a bidirectional link is expressed by following Expression (18):

$$\begin{cases} \overline{A}_{IJ} = A_{IJ} + A_{JI} & (I \ne J) \\ \overline{A}_{II} = 0 \end{cases} \quad (18)$$

A bidirectioned adjacency matrix is specifically expressed by following Expressions (19) to (22):

$$\overline{A}_{ij} = \frac{m}{\tilde{k}_{out}(j)} A_{ij} + \frac{m}{\tilde{k}_{out}(i)} A_{ji} \quad (19)$$

$$\overline{A}_{N+1j} = \frac{m}{\tilde{k}_{out}(j)} E + \frac{m}{N} \quad (20)$$

$$\overline{A}_{iN+1} = \frac{m}{N} + \frac{m}{\tilde{k}_{out}(i)} E \quad (21)$$

$$\overline{A}_{N+1N+1} = 0 \quad (22)$$

In the above, $$\overline{A}_{IJ}$$

is a symmetric matrix. Therefore, the following is attained:

$$\overline{A}_{IJ} = \overline{A}_{JI} \quad (23)$$

and k(j) and k(N+1) are expressed by following Expressions (24) and (25), respectively:

$$k(j) = \sum_{l=1, l \ne j}^{N+1} \overline{A}_{lj} \quad (24)$$

$$= \sum_{l=1, i \ne j}^{N+1} \tilde{A}_{lj} + \sum_{l=1, i \ne j}^{N+1} \tilde{A}_{jl}$$

$$= m + m\left(\tilde{k}(j) + \frac{1}{N}\right)$$

$$k(N+1) = \sum_{l=1, l \ne N+1}^{N+1} \overline{A}_{lN+1} \quad (25)$$

$$= \sum_{l=1, l \ne N+1}^{N+1} \tilde{A}_{lN+1} + \sum_{l=1, l \ne +1}^{N+1} \tilde{A}_{N+1l}$$

$$= m(1 + E\tilde{K})$$

Next, the bidirectioned adjacency matrix $$\overline{A}i_{IJ}$$

is normalized by k(j), and a transition probability matrix $T_{IJ}$ in which the weight of a link is expressed by a transition probability between nodes is produced. The transition probability matrix $T_{IJ}$ is expressed by following Expression (26):

$$\begin{cases} T_{IJ} = \frac{\overline{A}_{IJ}}{k(J)} & (I \ne J) \\ T_{II} = 0 \end{cases} \quad (26)$$

Specifically, $T_{IJ}$ is expressed by following Expressions (27) to (30):

$$T_{ij} = \frac{1}{k(j)} \overline{A}_{ij} \quad (27)$$

$$= \frac{1}{m + m\left(\tilde{k}(j) + \frac{1}{N}\right)} \left(\frac{m}{\tilde{k}_{out}(j)} A_{ij} + \frac{m}{\tilde{k}_{out}(i)} A_{ji}\right)$$

$$= \frac{1}{1 + \tilde{k}(j) + \frac{1}{N}} \left(\frac{1}{\tilde{k}_{out}(j)} A_{ij} + \frac{1}{\tilde{k}_{out}(i)} A_{ji}\right)$$

$$T_{N+1j} = \frac{1}{k(j)} \overline{A}_{N+1j} \quad (28)$$

$$= \frac{1}{m + m\left(\tilde{k}(j) + \frac{1}{N}\right)} \left(\frac{mE}{\tilde{k}_{out}(j)} + \frac{m}{N}\right)$$

$$= \frac{1}{1 + \tilde{k}(j) + \frac{1}{N}} \left(\frac{E}{\tilde{k}_{out}(j)} + \frac{1}{N}\right)$$

$$T_{iN+1} = \frac{1}{k(N+1)} \overline{A}_{iN+1} \quad (29)$$

$$= \frac{1}{m(1 + E\tilde{K})} \left(\frac{m}{N} + \frac{mE}{\tilde{k}_{out}(i)}\right)$$

$$= \frac{1}{(1 + E\tilde{K})} \left(\frac{1}{N} + \frac{E}{\tilde{k}_{out}(i)}\right)$$

$$T_{N+1N+1} = 0 \quad (30)$$

As apparent also from Expressions (27) to (30) above, the transition probability matrix $T_{IJ}$ does not depend on the value of m which is set as the total sum of out-links per node.

The link weight calculating portion 26 stores the transition probability matrix $T_{IJ}$ in which the weights of the links calculated by the above-described process are stored, into the data storage portion 20.

The data processing portion 28 implements calculation of evaluation values of the nodes until predetermined termination conditions are satisfied, on the basis of evaluation values (ranks) of documents stored in the data storage portion 20 and the transition probability matrix $T_{IJ}$ indicating the weights of the links between nodes, in accordance with a predetermined algorithm (for example, the page rank algorithm, the spreading activation, or the continuous fixed point attractor dynamics). A dynamic technique is disclosed in, for example, JP-A-2006-133844, JP-A-2006-243804, and JP-A-2006-060124. In the case of the page rank algorithm, for example, the predetermined termination conditions may be whether or not a predetermined equilibrium state such as that the total sum of evaluation values "flowing into" the nodes through the links is equal to that of evaluation values "flowing out" from the nodes through the links are satisfied.

The result outputting portion 30 outputs a process result on the basis of the evaluation values of the nodes which are calculated by the data processing portion 28. The process result may be output in the form of a list in which the evaluation values are arranged in descending order, or in a graph structure in which, as the evaluation value of a certain node is higher, the size of the node is larger. The result outputting portion 30 may display the obtained process result on a display device connected to the information analysis apparatus 10, or output by printing the process result.

Figure 3:
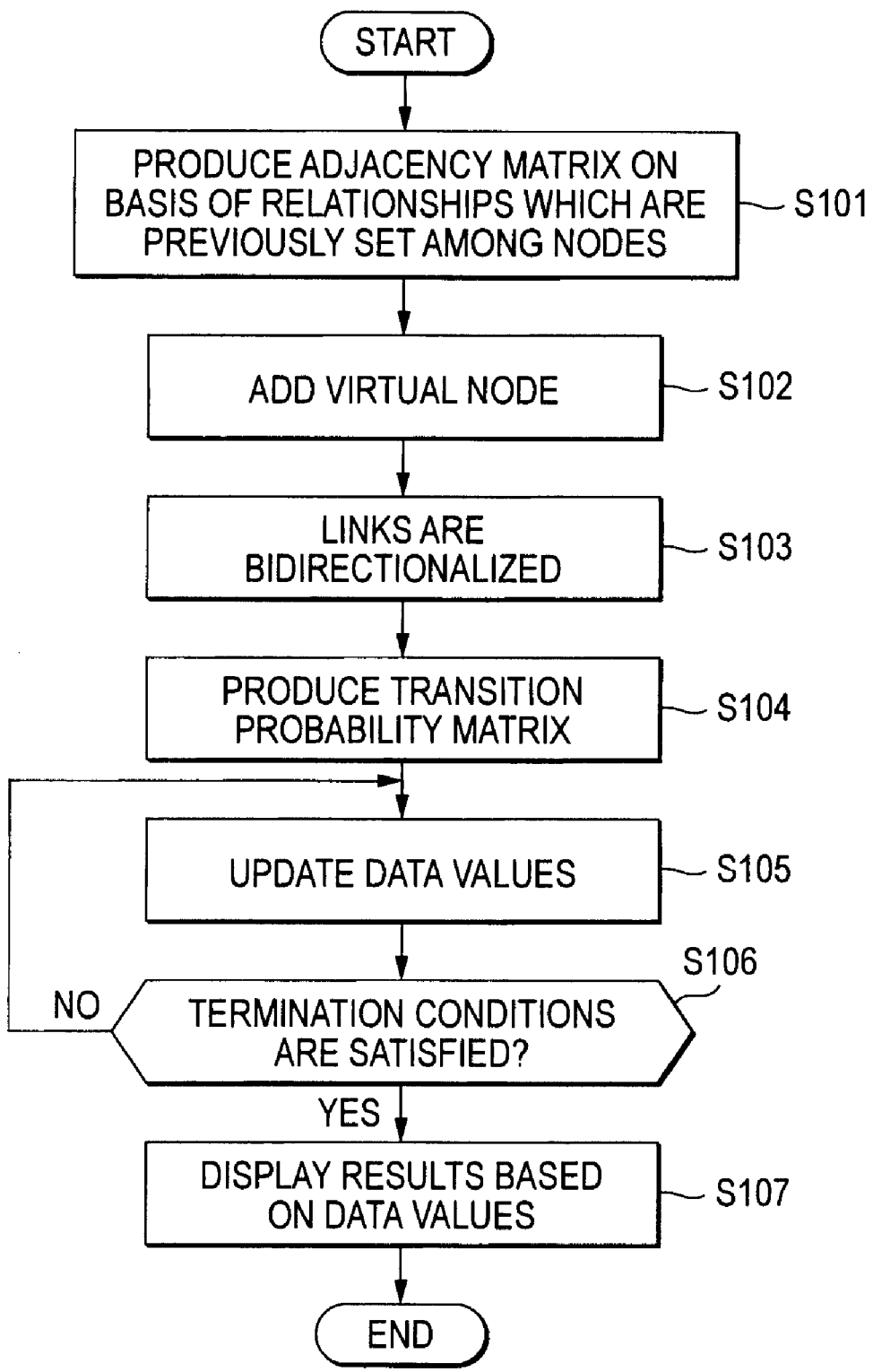
FIG. 3 is a flowchart illustrating a series of flows of a citation network analyzing process which is performed by the information analysis apparatus.

Next, a series of flows of the process of ranking documents constituting a citation network and conducted by the information analysis apparatus 10 of the embodiment will be described with reference to FIG. 3.

For a citation network in which plural documents are set as respective nodes and citation relationships among the documents are expressed by directioned links, the information analysis apparatus 10 produces an adjacency matrix on the basis of relationships which are previously set among the nodes (S101). Next, the information analysis apparatus 10 adds a virtual node to the citation network, and sets bidirectional links between the nodes and the virtual node to expand the adjacency matrix (S102). With respect to unidirected ones of directed links which are previously set among the nodes, the information analysis apparatus 10 virtually sets links which are paired with the unidirected links, and which are opposite in direction to the unidirected links, whereby the links are bidirectionalized to correct the adjacency matrix (S103).

The information analysis apparatus 10 normalizes the corrected adjacency matrix on the basis of the link number of each node, to produce a transition probability matrix (S104). The information analysis apparatus updates the evaluation values of the documents on the basis of the evaluation values (ranks) correlated with the respective documents and the produced transition probability matrix (S105). The updation of the evaluation values is repeated until the relationships of the evaluation values of the documents reach predetermined termination conditions (equilibrium state) according to the algorithm (S106). As the algorithm, a known algorithm such as the page rank algorithm, the spreading activation, or the continuous fixed point attractor dynamics may be used.

When it is determined that the evaluation values of the documents satisfy the predetermined termination conditions (S106: Y), the information analysis apparatus 10 produces a graph structure in which the sizes of nodes are changed on the basis of the evaluation values determined for the documents, for example, in accordance with the sizes of the evaluation values, and displays the graph on the display device (S107).

According to the above-described information analysis apparatus 10 of the embodiment, nodes having an out-link and those having no out-link can be handled by a unified technique, and the dependency of an analysis result on the value of m which is set as the total sum of numbers of out-links per node of a node group of the calculation object can be eliminated. Therefore, a higher reliable ranking result can be obtained.

Next, other embodiments of the invention will be described.

Example 2

The information analysis apparatus 10 of the second embodiment is different from the above-described information analysis apparatus 10 of the first embodiment in the following points. In the information analysis apparatus 10 of the first embodiment, the technique in which a virtual node is added, and a node having no out-link is eliminated so that all nodes are unifiedly handled, and which does not depend on the total sum m of out-links has been proposed. In the second embodiment, the dependency on the total sum m of out-links is eliminated, but nodes having no out-link are handled differently from those having an out-link.

In the information analysis apparatus 10 of the second embodiment, directed links are bidirectionalized without adding a virtual node, and then the link weight calculating portion 26 calculates the weights of the links in the following manner. First, the link weight calculating portion 26 regularizes the adjacency matrix $A_{ij}$ as shown in following Expression (31), or in different manners according to whether a node has an out-link or not.

$$\tilde{A}_{ij} = \begin{cases} \frac{m}{k_{out}(j)} A_{ij} & (k_{out}(j) \neq 0) \\ 0 & (k_{out}(j) = 0) \end{cases} \quad (31)$$

Each node does not cite itself, and hence the following is obtained:

$$\tilde{A}_{ii} = 0 \quad (32)$$

Here, the adjacency matrix is bidirectioned as shown in following Expressions (33) and (34):

$$\overline{A}_{ij} = \tilde{A}_{ij} + \tilde{A}_{ji} \quad (33)$$

$$\overline{A}_{ii} = 0 \quad (34)$$

At this time, the link k(j) of each node is expressed by following Expression (35) depending on whether the node has an out-link or not:

$$k(j) = \sum_{i=1}^{N} \overline{A}_{ij} \quad (35)$$

$$= \sum_{i=1}^{N} \tilde{A}_{ij} + \sum_{i=1}^{N} \tilde{A}_{ji}$$

$$= \begin{cases} m + m \sum_{i=1}^{N} \frac{A_{ji}}{k_{out}(i)} = m(1 + \kappa(j)) & (k_{out}(j) \neq 0) \\ m \sum_{i=1}^{N} \frac{A_{ji}}{k_{out}(i)} = m\kappa(j) & (k_{out}(j) = 0) \end{cases}$$

where $$\kappa(j) = \sum_{i=1}^{N} \frac{A_{ji}}{k_{out}(i)} \quad (36)$$

Here, the bidirectioned adjacency matrix $$\overline{A}_{ij}$$

is normalized by k(j), and a transition probability matrix $T_{ij}$ is obtained. In the case where j cites i, $$k_{out}(j) \neq 0 \quad (37)$$

and hence the following is obtained:

$$T_{ij} = \frac{1}{k(j)} \overline{A}_{ij} \quad (38)$$

-continued $$= \frac{1}{k(j)} \tilde{A}_{ij}$$

$$= \frac{1}{m(1+\kappa(j))} \frac{m}{k_{out}(j)}$$

$$= \frac{1}{(1+\kappa(j))k_{out}(j)}$$

In the case where i cites j, the following is obtained:

$$T_{ij} = \frac{1}{k(j)} \overline{A}_{ij} \quad (39)$$

$$= \frac{1}{k(j)} \tilde{A}_{ji}$$

$$= \begin{cases} \frac{1}{m(1+\kappa(j))} \frac{m}{k_{out}(i)} = \frac{1}{(1+\kappa(j))k_{out}(i)} & (k_{out}(j) \neq 0) \\ \frac{1}{m\kappa(j)} \frac{m}{k_{out}(i)} = \frac{1}{\kappa(j)k_{out}(i)} & (k_{out}(j) = 0) \end{cases}$$

As apparent also from Expressions (38) and (39) above, the transition probability matrix $T_{ij}$ does not depend on the value of m which is set as the total sum of out-links per node. When the transition probability matrix $T_{ij}$ is used, therefore, it is possible to obtain a highly reliable ranking result.

Example 3

Next, a third embodiment of the invention will be described. The third embodiment is similar to the first embodiment in that nodes having an out-link and those having no out-link can be unifiedly handled, and the dependency on the set value m of the total sum of out-links per node is eliminated, but different therefrom in that a virtual node is not added.

In the information analysis apparatus 10 of the third embodiment, directed links are bidirectionalized without adding a virtual node, and then the link weight calculating portion 26 calculates the weights of the links in the following manner. First, the link weight calculating portion 26 corrects the adjacency matrix $A_{ij}$ on the basis of following Expressions (40) and (41). When i and j are not equal to each other, $\epsilon > 0$ is set, and the following is obtained:

$$\tilde{A}_{ij} = \frac{m}{k_{out}(j) + \epsilon} \left( A_{ij} + \frac{\epsilon}{N-1} \right) \quad (40)$$

When i and j are equal to each other, the following is obtained:

$$\tilde{A}_{ii} = 0 \quad (41)$$

With respect to the corrected adjacency matrix, following Expressions (42) and (43) hold:

$$\sum_{i=1, i \neq j}^{N} \tilde{A}_{ij} = m \quad (42)$$

-continued $$\sum_{i=1, i \neq j}^{N} \tilde{A}_{ji} = m\kappa(j) \quad (43)$$

where $$\kappa(j) = \sum_{i=1, i \neq j}^{N} \frac{A_{ji} + \frac{\epsilon}{N-1}}{k_{out}(i) + \epsilon} \quad (44)$$

Next, the corrected adjacency matrix is bidirectionalized. When i and j are not equal to each other, $$\overline{A}_{ij} = \tilde{A}_{ij} + \tilde{A}_{ji} \quad (45)$$

and, when i and j are equal to each other, $$\overline{A}_{ii} = 0 \quad (46)$$

Of course, the bidirectionalized adjacency matrix is a symmetric matrix, and hence the following is attained:

$$\overline{A}_{ij} = \overline{A}_{ji} \quad (47)$$

Then, k(j) is expressed by following Expression (48):

$$k(j) = \sum_{i=1, i \neq j}^{N} \overline{A}_{ij} \quad (48)$$

$$= \sum_{i=1, i \neq j}^{N} \tilde{A}_{ij} + \sum_{i=1, i \neq j}^{N} \tilde{A}_{ji}$$

$$= m + m\kappa(j)$$

$$= m(1 + \kappa(j))$$

Here, the bidirectionalized adjacency matrix $$\overline{A}_{ij}$$

is normalized by k(j), and a transition probability matrix $T_{ij}$ which is expressed by following Expression (49) is obtained:

$$\begin{cases} T_{ij} = \frac{\overline{A}_{ij}}{k(j)} & (i \neq j) \\ T_{ii} = 0 \end{cases} \quad (49)$$

In the above, $T_{ij}$ is usually an asymmetric matrix. For $T_{ij}$, following Expression (50) holds:

$$T_{ij} = \frac{1}{k(j)} \overline{A}_{ij} \quad (50)$$

$$= \frac{1}{k(j)} (\tilde{A}_{ij} + \tilde{A}_{ji})$$

$$= \frac{1}{m(1+\kappa(j))} \left( \frac{m}{k_{out}(j)+\epsilon} \left( A_{ij} + \frac{\epsilon}{N-1} \right) + \frac{m}{k_{out}(i)+\epsilon} \left( A_{ji} + \frac{\epsilon}{N-1} \right) \right)$$

-continued $$= \frac{1}{(1+\kappa(j))}\left(\begin{array}{c}\frac{1}{k_{out}(j)+\varepsilon}\left(A_{ij}+\frac{\varepsilon}{N-1}\right)+\\ \frac{1}{k_{out}(i)+\varepsilon}\left(A_{ji}+\frac{\varepsilon}{N-1}\right)\end{array}\right)$$

As apparent also from Expression (50) above, the transition probability matrix $T_{ij}$ does not depend on m. According to the embodiment, nodes having an out-link and those having no out-link can be unifiedly handled.

The invention is not restricted to the above-described embodiments, and may of course be variously changed, modified, or replaced by those skilled in the art.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An information analysis apparatus comprising:
   a storage that stores data values while respectively correlating the data values with a plurality of nodes;
   a first setting unit that, for the nodes, sets a first virtual link that is directed oppositely to a predetermined directed link;
   a second setting unit that adds a virtual nodes to the nodes, and that sets a second virtual link which is bidirectional between the added virtual node and each of the nodes; and
   a updating unit that updates data values respectively correlated with the nodes, on the basis of respective weights of predetermined links between the nodes, the first virtual link, and the second virtual link.

2. The information analysis apparatus as claimed in claim 1, further comprising:
   a third setting unit that sets each of the weights of the predetermined links between the nodes, the first virtual link, and the second virtual link, on the basis of a probability of transition from one node connected to the link to another node.

3. An information analysis apparatus comprising:
   a storage that stores data values while respectively correlating the data values with a plurality of nodes;
   a first setting unit that, for the nodes, sets a virtual link that is directed oppositely to a predetermined directed link;
   a second setting unit that sets each of weights of the predetermined links between the nodes and the virtual link, on the basis of a probability of transition from one node connected to the link to another node; and
   a updating unit that updates data values respectively correlated with the nodes, on the basis of respective weights of predetermined links between the nodes and the virtual link.

4. A computer readable medium storing a program causing a computer to execute a process for performing an analysis in a network configured by a plurality of nodes where a directed link is set, the process comprising:
   storing data values while respectively correlating the data values with the nodes;
   setting a first virtual link that is directed oppositely to a predetermined directed link, for the nodes;
   adding a virtual node to the nodes, and setting a second virtual link which is bidirectional between the virtual node and each of the nodes; and
   updating data values respectively correlated with the nodes, on the basis of respective weights of predetermined links between the nodes, the first virtual link, and the second virtual link.

5. A computer readable medium storing a program causing a computer to execute a process for performing an analysis in a network configured by a plurality of nodes where a directed link is set, the process comprising:
   storing data values while respectively correlating the data values with the nodes;
   setting a virtual link that is directed oppositely to a predetermined directed link, for the nodes;
   setting each of weights of the predetermined links between the nodes and the virtual link, on the basis of a probability of transition from one node connected to the link to another node; and
   updating data values respectively correlated with the nodes, on the basis of respective weights of predetermined links between the nodes and the virtual link.

* * * * *